(12) United States Patent
Ducellier (10) Patent No.: US 6,510,003 B2
(45) Date of Patent: Jan. 21, 2003

(54) CYLINDRICAL POLARIZATION DIVERSITY ASSEMBLY

(75) Inventor: Thomas Ducellier, Ottawa (CA)

(73) Assignee: JDS Uniphase Inc., Ottawa (CA)

( * ) Notice: Subject to any disclaimer, the term of this patent is extended or adjusted under 35 U.S.C. 154(b) by 0 days.

(21) Appl. No.: 09/836,460

(22) Filed: Apr. 18, 2001

(65) Prior Publication Data
US 2002/0154405 A1 Oct. 24, 2002

(51) Int. Cl.[7] .................................................. G02B 5/30
(52) U.S. Cl. ........................ 359/495; 359/494; 359/500; 359/566; 359/618
(58) Field of Search .................................. 359/494, 495, 359/500, 566, 618

(56) References Cited

U.S. PATENT DOCUMENTS

| | | | |
|---|---|---|---|
| 4,885,734 A | 12/1989 | Yuzo | 369/45 |
| 5,233,405 A | 8/1993 | Wildnauer et al. | 356/333 |
| 5,436,755 A * | 7/1995 | Guerin | 359/495 |
| 5,886,785 A | 3/1999 | Lefevre et al. | 356/328 |

* cited by examiner

Primary Examiner—Cassandra Spyrou
Assistant Examiner—Craig Curtis
(74) Attorney, Agent, or Firm—Neil Teitelbaum (57) ABSTRACT

The invention provides a cylindrical polarization diversity circuit for narrowing the numerical aperture of an incoming beam of light in a direction perpendicular to the dispersion direction and without affecting the numerical aperture of the incoming beam of light in the direction of dispersion. A cylindrical lens is employed to provide an output beam having an elliptical cross-section. The output beam is collimated in one direction and diverging in a direction perpendicular thereto. A birefringent element having its walk-off direction oriented such that it coincides with the collimated beam direction separates the output beam into two orthogonally polarized sub-beams having an elliptical cross-section. The sub-beams are substantially non-overlapping. Advantageously, a halfwave plate is provided so as to make the polarization states of both sub-beams substantially parallel.

14 Claims, 6 Drawing Sheets

CYLINDRICAL POLARIZATION DIVERSITY ASSEMBLY

FIELD OF THE INVENTION

The present invention relates generally to the field of polarization diversity based optical devices.

BACKGROUND OF THE INVENTION

Many optical devices, such as diffractometers, spectral analyzers, or configurable add/drop demultiplexers, disperse a beam of light using a diffraction grating. Most devices include a collimator to make all the light incident on the grating or a prism parallel. Collimating is necessary to make sure that all light is incident at the same angle.

The efficiency of a grating is dependent on the polarization of the incident light. Highly dispersive diffraction gratings, such as 1200 l/mm reflection gratings or 1800 l/mm transmission gratings for 1.55 μm applications, suffer from a high Polarization Dependent Loss (PDL). In order to use these components, the design of such devices needs to incorporate a polarization balancing or polarization diversity.

Polarization balancing means that a double pass is forced on the diffraction grating with orthogonal polarization states. This averages the polarization sensitivity of the gratings. However, as a result, a large loss penalty in the order of 2.5 dB or more is encountered for highly dispersive gratings.

U.S. Pat. No. 5,886,785 discloses an optical spectrum analyzer wherein polarization balancing is used. A grating assembly using a Littmann-Metcalf configuration includes a reflector that forces a double pass on the grating. This assembly gives good optical stability by self-alignment when the reflector is a dihedron and gives a very good angular dispersion, which improves the optical resolution.

In the Littmann-Metcalf configuration, several parameters may be used to improve the resolution, but each of them causes specific problems. Thus, the improvement obtained by adopting a low grating pitch or groove spacing p causes a problem in the size of the system. Furthermore, since the analyzer includes a collimating lens of focal length f, increasing the focal length f increases the dispersion in the focal plane which improves the resolution. However, the dependence on chromatism is then increased, which causes difficulty in collimation and refocusing for some wavelengths. The resolution can also be improved by adopting a grazing incidence on the grating, but this causes an efficiency drop.

Furthermore, the analyzer in the Littmann-Metcalf configuration is sensitive to polarization of the incident wave, since the grating efficiency is very dependent on polarization for low angles of incidence on the grating. This causes a significant variation in the signal level with polarization.

A polarization diversity circuit, on the other hand, splits the incoming light into two sub-beams of orthogonal polarization by using a polarization beam splitter, such as a birefringent crystal. One of the two sub-beams is rotated by a halfwave plate so that the polarization states of both sub-beams are parallel. In this manner, one of the sub-beams is rotated to a preferred polarization state of the diffraction grating to reduce the loss penalty to less than 0.7 dB. Hence, the use of a polarization diversity is advantageous with highly dispersive diffraction gratings.

The common techniques to implement polarization diversity, such as using thermally expanded core (TEC) fibers or micro-collimated beams, narrow the numerical aperture (NA) of the incoming beam of light before splitting the incoming beam into two orthogonal polarization states in a birefringent crystal to achieve non-overlapping beams. However, these techniques affect the resolution of the grating and hence affect the resolution of any optical device based on diffraction gratings, such as demultiplexers, configurable optical add/drop demultiplexers (COADM), dynamic gain equalizers (DGE), or optical spectrum analyzers (OSA), because the beam size is smaller on the grating, illuminating a smaller number of lines.

It is an object of this invention to provide a polarization diversity circuit having a low loss penalty.

It is another object of the invention to maximize the beam size on the grating for improving the resolution of the grating.

Thus, it is an object of this invention to provide a polarization diversity circuit yielding high resolution optical devices, particularly optical devices that are based on diffraction gratings.

SUMMARY OF THE INVENTION

In accordance with the invention there is provided, a polarization diversity circuit comprising a cylindrical lens for receiving an input beam and for providing an output beam having a substantially eccentric cross-section; and a birefringent crystal optically coupled with the lens so as to receive the output beam from the lens and to provide two eccentric orthogonally polarized sub-beams each having a substantially eccentric cross-section.

In accordance with the invention, there is further provided a polarization diversity circuit comprising: a cylindrical optical element for receiving an input beam of light and for providing an output beam having a substantially elliptical cross-section, said elliptical cross-section having a major axis and a minor axis, said output beam being substantially collimated in a direction of the minor axis and substantially diverging in a direction of the major axis; and a birefringent element for receiving the output beam from the cylindrical optical element and for separating the output beam into two sub-beams having substantially orthogonal polarization states and having substantially elliptical cross-sections, said sub-beams being substantially collimated in the direction of the minor axis and substantially diverging in the direction of the major axis, and wherein the birefringent element is arranged to cause a displacement of one of the sub-beams in the direction of the minor axis.

In accordance with an embodiment of the invention the cylindrical optical element is a cylindrical lens. In accordance with a further embodiment of the invention the cylindrical optical element is a cylindrical mirror.

In accordance with another aspect of the invention, there is provided, a method of providing two spatially separated orthogonally polarized beams of light, comprising the steps of launching an input beam into and through an optical element having optical power that will provide an output beam having an eccentric cross-section; and launching the output beam into a birefringent crystal to obtain two orthogonally polarized spatially non-overlapping sub-beams.

BRIEF DESCRIPTION OF THE DRAWINGS

Exemplary embodiments of the invention will now be described in conjunction with the drawings in which:

FIG. 1b shows a schematic view of two circular sub-beams at an end face of a birefringent crystal of the prior art polarization diversity shown in FIG. 1a;

FIG. 2b shows a schematic view of two non-overlapping elliptical sub-beams at an end face of a birefringent crystal of the polarization diversity presented in FIG. 2a;

FIG. 3 shows a schematic top view of the cylindrical polarization diversity of FIG. 2a;

FIG. 4 shows a schematic side view of the cylindrical polarization diversity of FIG. 2a;

DETAILED DESCRIPTION OF THE INVENTION

In accordance with the present invention a cylindrical optical element is employed for narrowing the numerical aperture of the incoming beam of light in a direction perpendicular to a dispersion direction and without affecting the numerical aperture of the incoming beam of light in the direction of dispersion. This is similar to a micro-collimated beam of light in the perpendicular direction enabling an easy separation of two incoming states of polarization through an appropriate choice of a birefringent crystal length. This does not affect the resolution of the grating since the size of the incoming beam is not changed in the direction of dispersion.

Figure 1A:
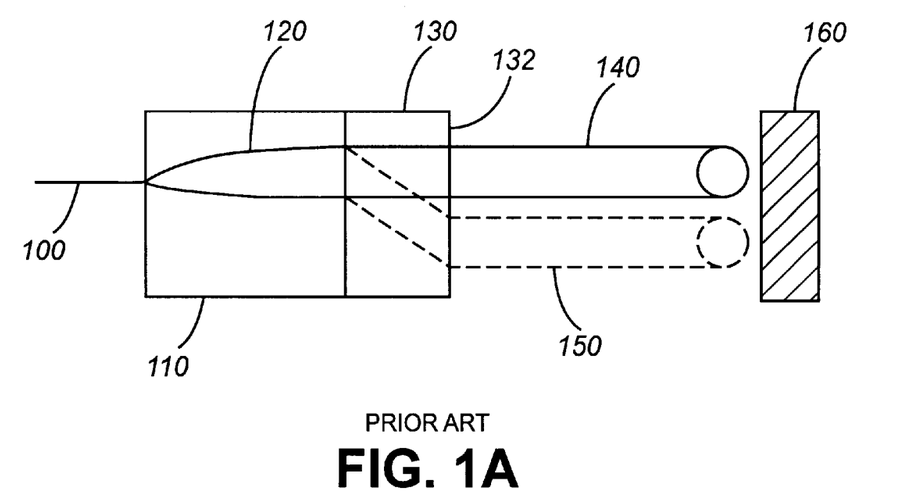
FIG. 1a shows a schematic view of a prior art polarization diversity.
Figure 1B:
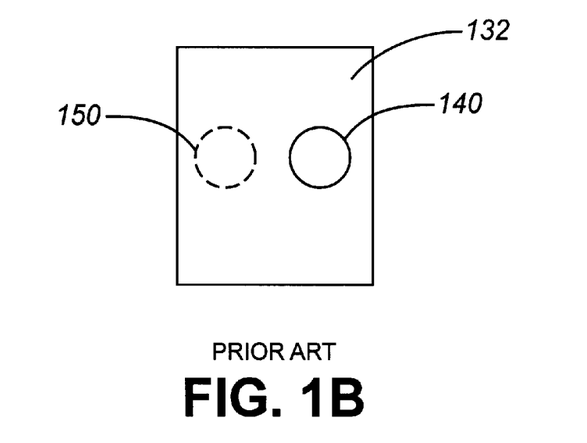

FIG. 1a shows a schematic view of a prior art polarization diversity wherein an incoming beam of light 100 is collimated by a GRIN lens 110. The collimated beam of light 120 is split into two collimated sub-beams 140 and 150 by a birefringent crystal 130 having an end face 132. As is seen from FIGS. 1a and 1b, the o-ray 140 and the e-ray 150 have circular cross-sections when exiting the birefringent crystal 130 at an end face 132. Both sub-beams illuminate a diffraction grating 160. Changing the numerical aperture of the sub-beams 140 and 150 so that they do not overlap each other has a negative effect on the resolution of the grating, as discussed above. The circuit depicted in FIG. 1a may further include a halfwave plate (not shown) disposed immediately behind the birefringent crystal 130 so as to make the polarization states of both sub-beams parallel.

Figure 2A:
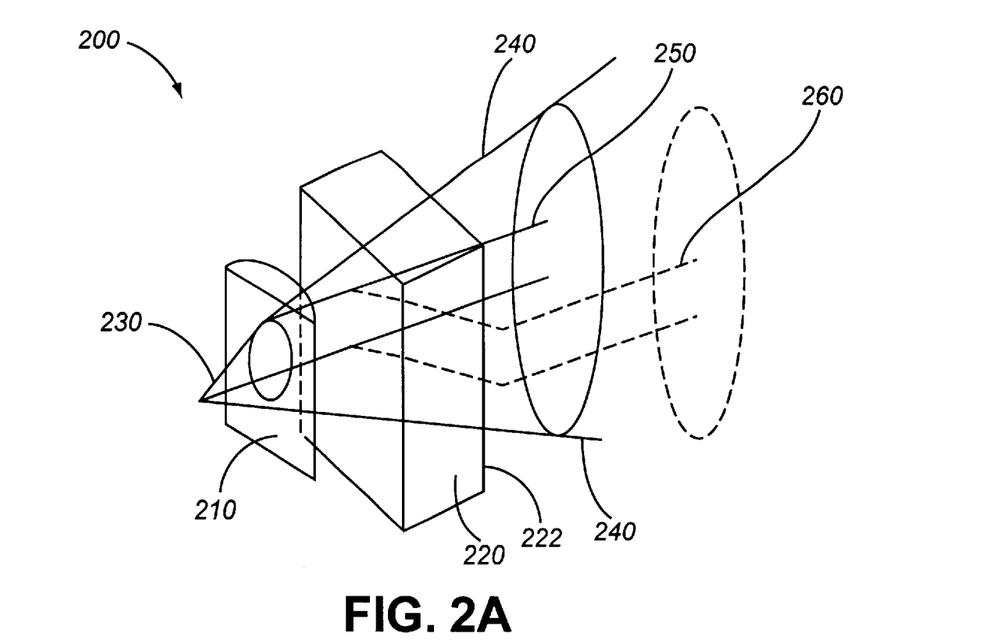
FIG. 2a shows an oblique view of a cylindrical polarization diversity in accordance with the present invention.
Figure 2B:
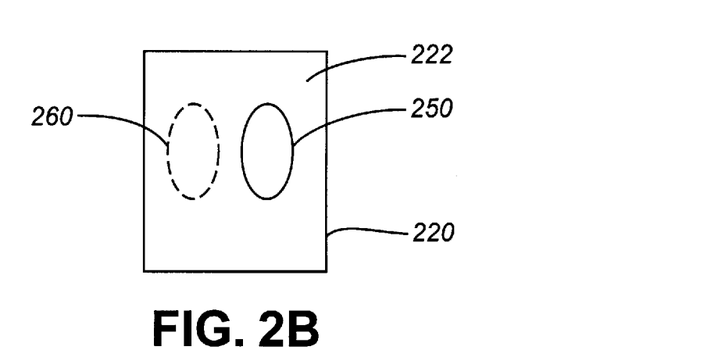

FIG. 2a shows an oblique view of a cylindrical polarization diversity 200 in accordance with the present invention including a cylindrical lens 210 and a birefringent walk-off element 220, such as a rutile ($TiO_2$) crystal or any other suitable crystal, for example yttrium vanadate ($YVO_4$), magnesium fluoride ($MgF_2$), quartz ($SiO_2$), lithium niobate ($LiNbO_3$), or calcite ($CaCO_3$). The incoming beam of light 230 is collimated by cylindrical lens 210 in only one direction and diverges in another direction perpendicular thereto to produce an output beam having an eccentric or elliptical cross-section. The elliptical output beam is collimated in the direction of the minor axis and diverging in the direction of the major axis. The divergent portion of the elliptical beam is denoted with reference numeral 240. Birefringent element 220 is oriented such that the direction in which the elliptical beam is collimated corresponds to the walk-off direction of the birefringent element 220. Upon passing through birefringent element 220 the elliptical beam is separated into two elliptical sub-beams, an o-ray 250 and an e-ray 260 having orthogonal polarization states of elliptical spot shape or an eccentric cross-section by displacing one of the elliptical sub-beams in the direction of the minor axis of its elliptical cross-section. Both elliptical sub-beams 250 and 260 are relatively narrow in one direction and do not overlap with one another. Sub-beams 250 and 260 are collimated in the direction of the minor axis and diverging in the direction of the major axis. This is shown in more detail in FIG. 2b presenting a schematic view of the two non-overlapping elliptical sub-beams 250 and 260 at an end face 222 of birefringent crystal 220. Since the collimated portion of the sub-beam is in the walk-off direction of the birefringent crystal, the walk-off can be increased to an arbitrary limit. This allows for a convenient insertion of a halfwave plate (not shown) into the polarization diversity. Since the direction in which the sub-beams diverge, i.e. in the direction of the major axis of the sub-beams, is not modified, the sub-beams diverge as normal in this direction.

Figure 2C:
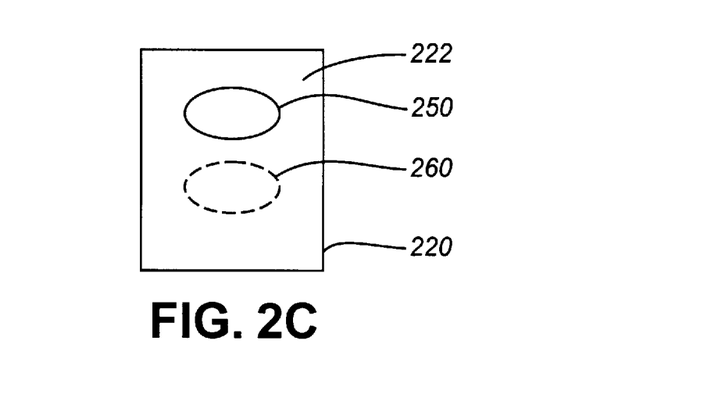
FIG. 2c shows a schematic view of two non-overlapping elliptical sub-beams at an end face of a birefringent crystal if the polarization diversity of FIG. 2a is rotated by 90°.

FIG. 2c presents a schematic view of an alternative embodiment of the present invention showing two non-overlapping elliptical sub-beams at an end-face 222 of birefringent crystal 220. The elliptical sub-beams 250 and 260 are shown to be perpendicular to the elliptical sub-beams 250 and 260 of FIG. 2b as a result of a 90° rotation of the polarization diversity presented in FIG. 2a.

Figure 3:
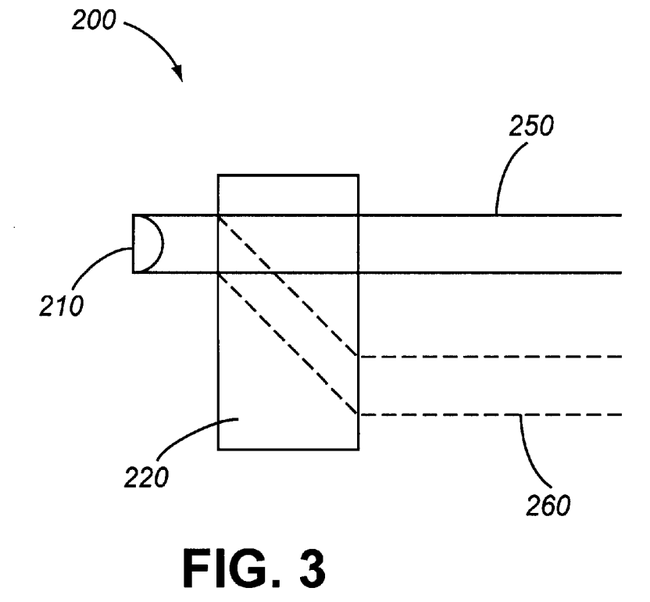

FIG. 3 presents a schematic top view of the cylindrical polarization diversity 200 of FIG. 2a showing more clearly how the elliptical output beam of light is separated into two elliptical sub-beams, the o-ray 250 and the e-ray 260, by displacing one of the elliptical sub-beams in the direction of the minor axis upon passing through birefringent element 220.

Figure 4:
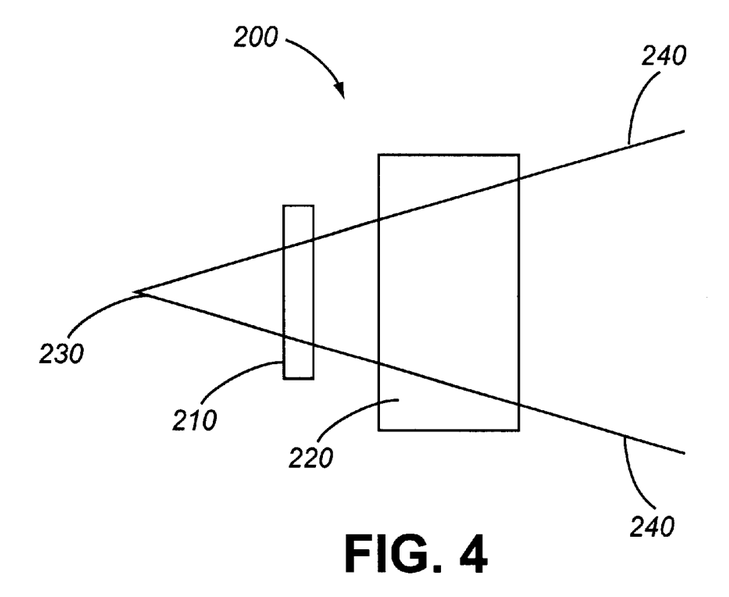

FIG. 4 presents a schematic side view of the cylindrical polarization diversity of FIG. 2a showing more clearly the divergent portion of the beam 240 after the incoming beam of light 230 is passed through the cylindrical lens 210. Since the birefringent walk-off element 220 is arranged such that the direction in which the beam is collimated (as shown in FIG. 3) coincides with the walk-off direction it does not affect the divergent portion of the elliptical beam 240.

Figure 5:
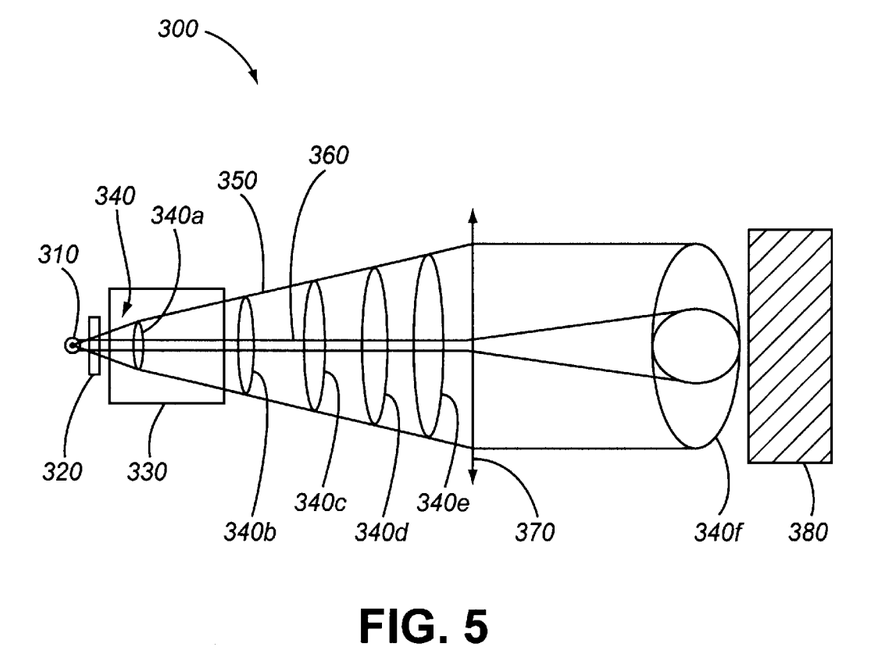
FIG. 5 depicts another embodiment of a cylindrical polarization diversity in accordance with the present invention presented in a schematic side view.

FIG. 5 depicts another embodiment of a cylindrical polarization diversity 300 in accordance with the present invention presented in a schematic side view. An incoming beam of light 310 is passed through a cylindrical lens 320 and subsequently through a birefringent walk-off element 330. Again, the walk-off direction of birefringent element 330 is arranged such that it coincides with the direction in which the beam of light is collimated. However, for clarity reasons only an o-ray is shown in FIG. 5. Cylindrical lens 320 provides an elliptical output beam 340 having an eccentric cross-section 340a. The output beam 340 includes a divergent component 350 and a collimated component 360. As the output beam 340 propagates towards a lens 370, the eccentric cross-section of beam 340 is expanding as indicated by reference numerals 340a through 340e. The expanded elliptical beam 340 is passed through lens 370 to image the elliptical beam 340 onto a grating 380. The lens 370 collimates the diverging portion 350 of the elliptical output beam 340 and slightly decollimates the collimated portion 360 of the elliptical output beam 340, as indicated by cross-section 340f. It is desired to allow the beam to expand as large as possible in order to maximize the number of lines illuminated on the grating 380 by the elliptical output beam 340.

Advantageously, the beam size is not affected by the polarization diversity in the dispersion plane so that the resolution of the grating is conserved.

Figure 6:
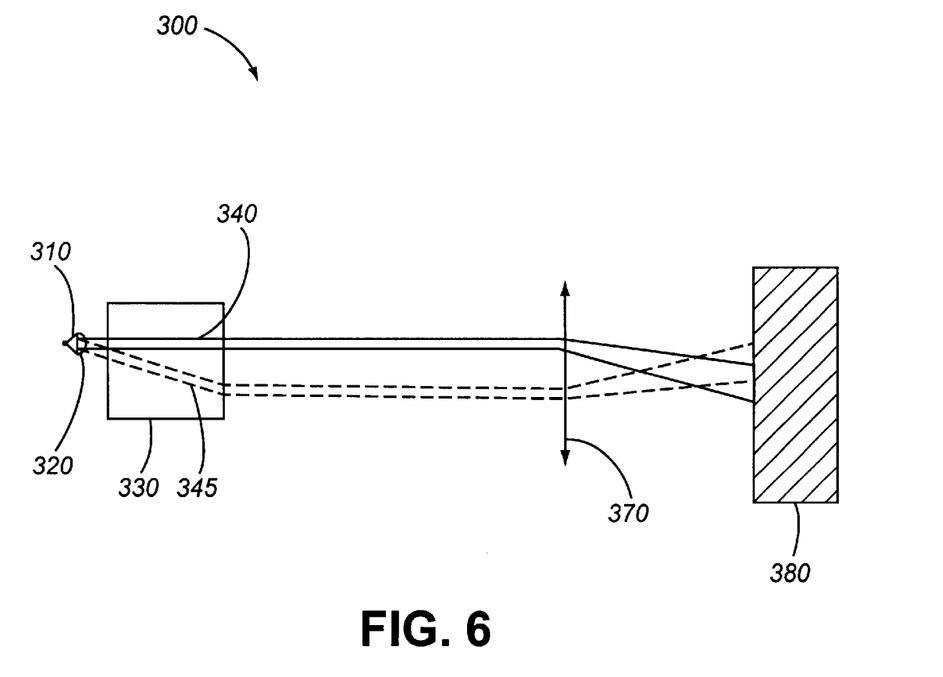
FIG. 6 shows a schematic top view of the cylindrical polarization diversity assembly of FIG. 5 depicting both sub-beams but omitting the divergent portions of the sub-beams.

FIG. 6 shows a schematic top view of the cylindrical polarization diversity assembly 300 of FIG. 5 depicting both sub-beams, the o-ray 340 and the e-ray 345, but omitting the divergent portions of the sub-beams. The incoming beam of light 310 is passed through cylindrical lens 320 which collimates beam 310 in one direction and leaves it virtually unaffected in an orthogonal direction thereto. Birefringent element 330 is arranged such that its walk-off direction coincides with the direction in which the beam is collimated by cylindrical lens 320. The elliptical beam is separated by birefringent walk-off element 330 into two sub-beams of orthogonal polarization states, the o-ray 340 and the e-ray 345.

The sub-beams are no longer circular but have an elongated elliptical shape. The narrow elongated direction is perpendicular to the walk-off direction so as to allow the usage of smaller birefringent elements for providing separated sub-beams. The length of the walk-off is selected to achieve enough separation of the sub-beams for further beam processing, such as changing the polarization state of one of the sub-beams to make the polarization states of both sub-beams parallel.

Both sub-beams, the o-ray 340 and the e-ray 345, continue to expand in the divergent direction until they reach lens 370. However, this expansion in beam size is not seen in FIG. 6 since the divergent portion of the sub-beams is omitted from this figure for clarity reasons. The expansion of the sub-beam was presented in conjunction with FIG. 5.

Lens 370 images the expanded o-ray 340 and e-ray 345 onto grating 380. In doing so, the divergent portion of the sub-beams is collimated by lens 370 and the collimated portion of the sub-beams 340 and 345 is slightly decollimated. Thus, the two sub-beams 340 and 345 are slightly decollimated when illuminating the grating 380. Grating 380 is shown to intercept the sub-beams so as to spatially disperse the sub-beams in a wavelength dependent manner into two same wavefronts.

The present invention finds its best application in optical devices using a polarization sensitive diffraction grating. It enables the implementation of a polarization diversity scheme without compromising the wavelength resolution of the device. This is achieved by providing a cylindrical polarization diversity in a direction perpendicular to the dispersion direction of the diffraction grating.

The numerical aperture (NA) of an optical beam in the diffraction direction determines the wavelength resolution of the device, while the numerical aperture (NA) of the optical beam in the direction perpendicular thereto has no impact on this. Therefore, the arrangement of a cylindrical polarization diversity in a direction perpendicular to the diffraction direction allows to use a polarization sensitive diffraction grating without compromising the resolution.

Advantageously, the invention is applied to improve the resolution of any devices based on polarization sensitive diffraction gratings, such as demultiplexers, configurable optical add/drop demultiplexers (COADM), dynamic gain equalizers (DGE), or optical spectrum analyzers (OSA). However, the invention is not intended to be limited to devices based on diffraction gratings but rather extends to any devices that benefit from employing a cylindrical polarization diversity.

Figure 7:
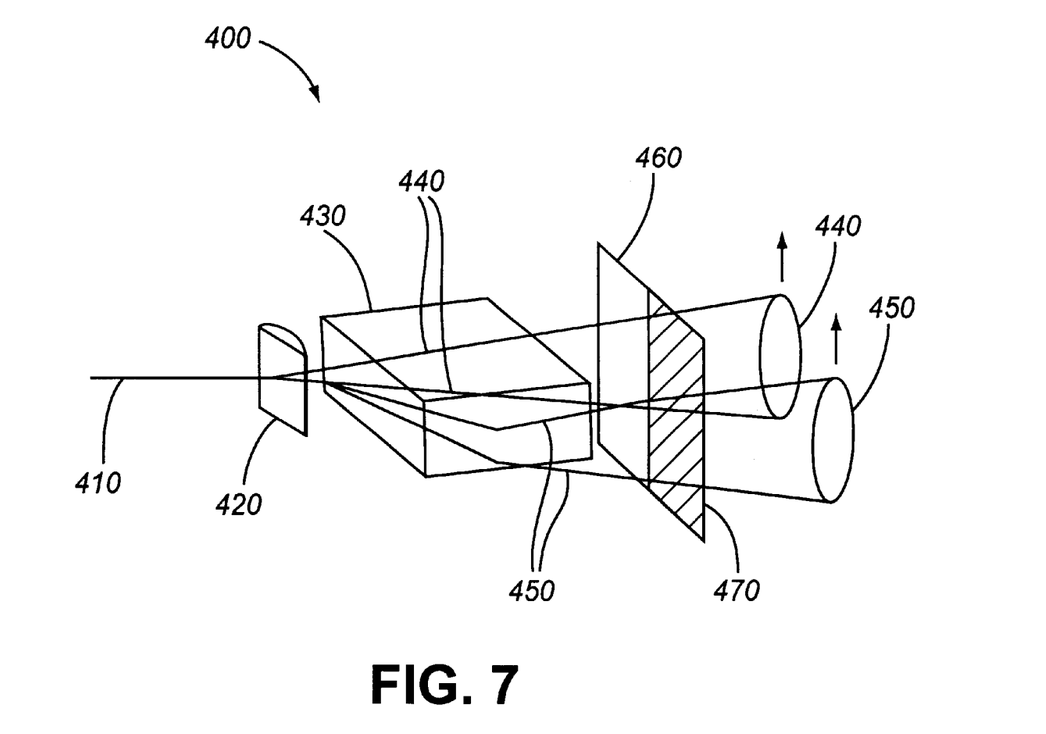
FIG. 7 presents an oblique view of another embodiment of a cylindrical polarization diversity in accordance with the invention including a halfwave plate/glass plate.

FIG. 7 presents an oblique view of another embodiment of a cylindrical polarization diversity 400 in accordance with the present invention including a halfwave plate/glass plate. An optical fiber 410 provides an input beam of light to cylindrical lens 420 which collimates the beam in one direction and allows it to diverge in another direction perpendicular to the direction of collimation. Birefringent element 430 is arranged such that its walk-off direction corresponds to the direction of the minor axis of the elliptical beam. The input beam is separated into two elliptical sub-beams of orthogonal polarization states, namely o-ray 440 and e-ray 450. Upon exiting birefringent element 430, the o-ray 440 passes through a glass dummy plate 460 and the e-ray 450 passes through a halfwave plate 470 which rotates its polarization state by 90 degrees so as to make the polarization states of both, the o-ray 440 and the e-ray 450, parallel, as indicated by the two parallel arrows of FIG. 7.

Numerous other embodiments can be envisaged without departing from the spirit and scope of the invention.

What is claimed is:

1. A polarization diversity circuit comprising:
   a cylindrical lens for receiving an input beam and for providing an output beam having an eccentric cross-section; and
   a birefringent crystal optically coupled with the cylindrical lens so as to receive the output beam from the cylindrical lens and to provide two eccentric orthogonally polarized sub-beams each having an eccentric cross-section.

2. A polarization diversity circuit as defined in claim 1 wherein the eccentric cross-section of the output beam includes a minor axis and a major axis and wherein the output beam is collimated in a direction of the minor axis.

3. A polarization diversity circuit as defined in claim 2 wherein the sub-beams are substantially non-overlapping as they exit the birefringent crystal.

4. A polarization diversity circuit as defined in claim 2 wherein the sub-beams are non-overlapping as they exit the birefringent crystal.

5. A polarization diversity circuit as defined in claim 3, further comprising a grating for intercepting at least one of the sub-beams and for spatially dispersing said sub-beam in a wavelength dependent manner.

6. A polarization diversity circuit as defined in claim 3, further comprising a grating for intercepting the sub-beams and for spatially dispersing said sub-beams in a wavelength dependent manner into two substantially same wavefronts.

7. A method of providing two spatially separated orthogonally polarized beams of light, comprising the steps of:
   launching an input beam into and through an optical element having optical power that will provide an output beam having an eccentric cross-section; and
   launching the output beam into a birefringent crystal to obtain two orthogonally polarized spatially non-overlapping sub-beams.

8. A method as defined in claim 7, further comprising the steps of allowing the sub-beams to impinge upon a grating to obtain two spatially separated wavefronts each of which is dispersed in a wavelength dependent manner.

9. A polarization diversity circuit comprising:
   a cylindrical optical element for receiving an input beam of light and for providing an output beam having, an elliptical cross-section, said elliptical cross-section having a major axis and a minor axis, said output beam being collimated in a direction of the minor axis and diverging in a direction of the major axis; and a birefringent element for receiving the output beam from the cylindrical optical element and for separating the output beam into two sub-beams having orthogonal polarization states and having elliptic cross-sections, said sub-beams being collimated in the direction of the minor axis and diverging in the direction of the major axis, and wherein the birefringent element is arranged to cause a displacement of one of the sub-beams in the direction of the minor axis.

10. The polarization diversity circuit as defined in claim 9 wherein the two sub-beams are substantially non-overlapping.

11. The polarization diversity circuit as defined in claim 10 further including a halfwave plate for rotating one of the substantially orthogonal polarization states of the two sub-beams to make the polarization states of the two sub-beams substantially parallel.

12. The polarization diversity circuit as defined in claim 10 wherein the cylindrical optical element is one of a cylindrical lens and a cylindrical mirror.

13. The polarization diversity circuit as defined in claim 10 wherein the birefringent element is a rutile ($TiO_2$) crystal.

14. The polarization diversity circuit as defined in claim 10 wherein the birefringent element is selected from the group consisting of yttrium vanadate ($YVO_4$), magnesium fluoride ($MgF_2$), quartz ($SiO_2$), lithium niobate ($LiNbO_3$), and calcite ($CaCO_3$).

* * * * *